United States Patent
Pacella et al.

(10) Patent No.: US 6,817,665 B2
(45) Date of Patent: Nov. 16, 2004

(54) SEAT BASE WITH LOAD LEG

(75) Inventors: Jonathan M. Pacella, Honey Brook, PA (US); Michael L. Longenecker, Ephrata, PA (US); Jason A. Carpenter, Reinholds, PA (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 10/120,364

(22) Filed: Apr. 12, 2002

(65) Prior Publication Data

US 2003/0020308 A1 Jan. 30, 2003

(30) Foreign Application Priority Data

Jul. 26, 2001 (AU) .............................................. 57664/01
Jul. 26, 2001 (EP) .............................................. 01118100

(51) Int. Cl.[7] .............................. A47C 1/08; B60N 2/42
(52) U.S. Cl. .............................. 297/250.1; 297/256.16; 297/216.11
(58) Field of Search ..................... 297/256.16, 216.11, 297/250.1; 403/374.1, 374.2, 374.3, 109.5

(56) References Cited

U.S. PATENT DOCUMENTS

| | | | | |
|---|---|---|---|---|
| 1,451,655 A | * | 4/1923 | Gilley ..................... 297/250.1 |
| 3,052,500 A | | 9/1962 | Hyde |
| 3,811,455 A | * | 5/1974 | Thur .......................... 135/25.4 |
| 4,067,608 A | * | 1/1978 | Von Wimmersperg . 297/216.11 |
| 4,113,306 A | * | 9/1978 | von Wimmersperg . 297/216.11 |
| 4,174,900 A | * | 11/1979 | Ina ........................... 248/163.1 |
| 4,640,545 A | | 2/1987 | Von Wimmersperg |
| 5,277,472 A | | 1/1994 | Freese et al. |
| 5,286,085 A | | 2/1994 | Minami |
| 5,487,588 A | * | 1/1996 | Burleigh et al. ............ 297/253 |
| 5,667,272 A | * | 9/1997 | Sutton ......................... 297/140 |
| 5,671,971 A | * | 9/1997 | Koyanagi et al. ........ 297/250.1 |
| 5,810,435 A | * | 9/1998 | Surot ........................ 297/250.1 |
| 5,820,215 A | | 10/1998 | Dreisbach |

(List continued on next page.)

FOREIGN PATENT DOCUMENTS

| | | |
|---|---|---|
| EP | 0 164 909 A2 | 12/1985 |
| EP | 0 200 411 A2 | 12/1986 |
| EP | 0 485 121 A1 | 5/1992 |
| EP | 0 693 393 A1 | 1/1996 |
| EP | 0 791 500 A2 | 8/1997 |
| EP | 0 813 992 A2 | 12/1997 |
| EP | 0 822 115 A2 | 2/1998 |
| FR | 2 741 847 A1 | 6/1997 |
| NL | 9 500 514 A | 10/1996 |

OTHER PUBLICATIONS

WO 89/01422: Sold et al., Child Restraint, Feb. 23, 1989.*
Photographs of Storchenmühle car seat 3 pp. (available pre–Apr. 2002).

Primary Examiner—Peter M. Cuomo
Assistant Examiner—Sarah C. Burnham
(74) Attorney, Agent, or Firm—Foley & Lardner LLP

(57) ABSTRACT

In order to facilitate child seat installment in a vehicle and to improve performance of a child seat during front impact vehicular collisions, a seat arrangement is provided that includes a seat base into which the child seat can be detachably connected and a load leg pivotally mounted at one end of the base. The load leg is provided with a telescopic length adjustment, which allows the length of the load leg to be adjusted and then to be securely locked at a selected length. The top end of the load leg is provided with a fold latch arrangement which automatically engages when the load leg is rotated from a stored position to an operative one. This arrangement has a push-button type release feature to facilitate easy folding. Alligator clamp-like members (one on either side of the seat base) are provided at the other end of the base to clamp the seat belt, which is used to secure the base to a vehicle seat cushion, and to prevent the belt from slipping in its axial direction.

9 Claims, 8 Drawing Sheets

U.S. PATENT DOCUMENTS

| | | | | |
|---|---|---|---|---|
| 5,836,650 A | * | 11/1998 | Warner et al. | 297/256.11 |
| 5,860,695 A | * | 1/1999 | Espenshade et al. | 297/130 |
| 6,000,753 A | | 12/1999 | Cone, II | |
| 6,062,647 A | * | 5/2000 | Mei | 297/411.36 |
| 6,474,900 B2 | * | 11/2002 | Feng | 403/322.4 |
| 6,540,300 B2 | * | 4/2003 | Piretti | 297/411.35 |

\* cited by examiner

SEAT BASE WITH LOAD LEG

This application claims benefit to Australian patent application No. 57664/01 and to European patent application No. 01 118100.5, both of which are hereby incorporated by reference.

BACKGROUND OF THE INVENTION

1. Field of the Invention

The present invention relates generally to a seat base for a child's vehicular seat and more specifically to a seat base for the child's seat from which the child's seat can be selectively engaged and disengaged and which has an adjustable stabilizing load leg that engages the floor of the vehicle.

2. Related Art

It has been proposed to provide a seat base, from which a child's vehicular seat can be selectively engaged and disengaged, that can be left on the vehicle seat cushion once it has been properly installed on the seat cushion. In addition, it has been proposed to add a so-called "load leg" which extends between the seat base and the floor of the vehicle to improve the stability/performance of the child's seat in the event of a frontal impact during a vehicular collision. The load leg is intended to prevent rotation of the seat base and child's seat in the event of such a vehicular collision and thus to limit the excursion of a seat occupant's head beyond acceptable limits. However, load leg arrangements, thus far, have lacked user-friendliness and have tended to be cumbersome to use, which invites improper disposition/adjustment.

SUMMARY OF THE INVENTION

The present invention provides a seat base with a load leg arrangement that improves the ease of disposition, folding and adjustment of the load leg arrangement relative to the seat base. The present invention also provides a seat base that includes a lock off device to easily capture and securely hold a vehicle shoulder belt in position relative to the seat base to retain the seat base on the vehicle seat.

In order to achieve the above advantages, the present invention provides a seat base with a load leg that is pivotally mounted at one end of a seat base. The load leg is provided with a length adjustment feature that allows the length of the load leg to be adjusted and then to be securely locked at a selected length. In addition, the load leg is provided with a fold latch arrangement, which automatically engages latch-receiving members in the seat base when the load leg is rotated from a stored position to an operative one to lock the load leg in the operative position. The latching or locking arrangement has, in one embodiment, a push-button type release feature to facilitate easy release and folding of the load leg to the stored position.

The seat base also includes alligator clamp-like members, one on either side of the base, to clamp a vehicle shoulder belt to the seat base and prevent the belt from slipping along the belt's axial direction. The clamp-like members thus secure the seat base to the vehicle seat via the vehicle belt.

More specifically, a first aspect of the present invention resides in a seat arrangement comprising a seat supporting base member adapted to be secured to a vehicle seat by way of a seat belt, and a load leg which is adjustable in length and pivotally supported at one end of the base member.

In this seat arrangement, the load leg is provided with a lock mechanism for locking the load leg in an operative position when it is pivoted from a stored position to the operative position. Additionally, the length adjustment of the load leg is controlled by a selectively releasable latch mechanism which locks the load leg against change in axial length.

Further, this seat arrangement further comprises an easy to use lock-off device, which is adapted to receive a vehicle belt and to clamp the belt against movement in its axial direction. This lock off device comprises a clamp having inner and outer members which are operatively connected with one another such that webbing of a vehicle belt, when slid and clamped between the inner and outer members, is prevented from sliding along its length.

In more detail, the inner member of the above lock-off device is fixed to a surface of the base member, while the outer member has one end immovably fastened to one end of the inner member and is superimposed over the inner member so that a seat belt receiving clearance is established between the free end of the outer member and a corresponding end of the inner member.

A second aspect of the invention resides in a seat arrangement having a base member to which a child's seat can selectively attached and detached, a load leg extending from one end of the base member for engagement with a floor of the vehicle, and a lock off device for a seat belt, the lock off device being characterized by an inner member fixed to a surface of the base member; and an outer member having one end immovably integral with one end of the inner member and superimposed over the inner member so that a tapering clearance, into which seat belt webbing can be easily slid, is established between the free end of the outer member and a corresponding end of the inner member.

This seat arrangement is further characterized in that the load leg is pivotally mounted to the base member. In addition, the load leg is adjustable in length.

To facilitate deployment of the load leg, the load leg is provided with a latch mechanism to permit the load leg to be locked at a selected length. In accordance with this aspect, this latch mechanism has at least one pivotal latch member that selectively engages openings formed in a strut reciprocatively mounted in a housing also forming part of the load leg.

Further, the load leg includes a fold latch arrangement which holds the load leg in an operative position until the load leg is manually released. This fold latch arrangement comprises a lock member that protrudes through an opening formed in the base member and locks the load leg against pivotal movement until the lock member manually depressed to a level whereat engagement between the lock member and the base member is absent.

BRIEF DESCRIPTION OF THE DRAWINGS

The various aspects and attendant advantages of the present invention will become more clearly appreciated as a detailed description of an embodiment of the present invention and alternate arrangements, is given with reference to the appended drawings in which.

DETAILED DESCRIPTION OF THE PREFERRED EMBODIMENTS

Figure 1:
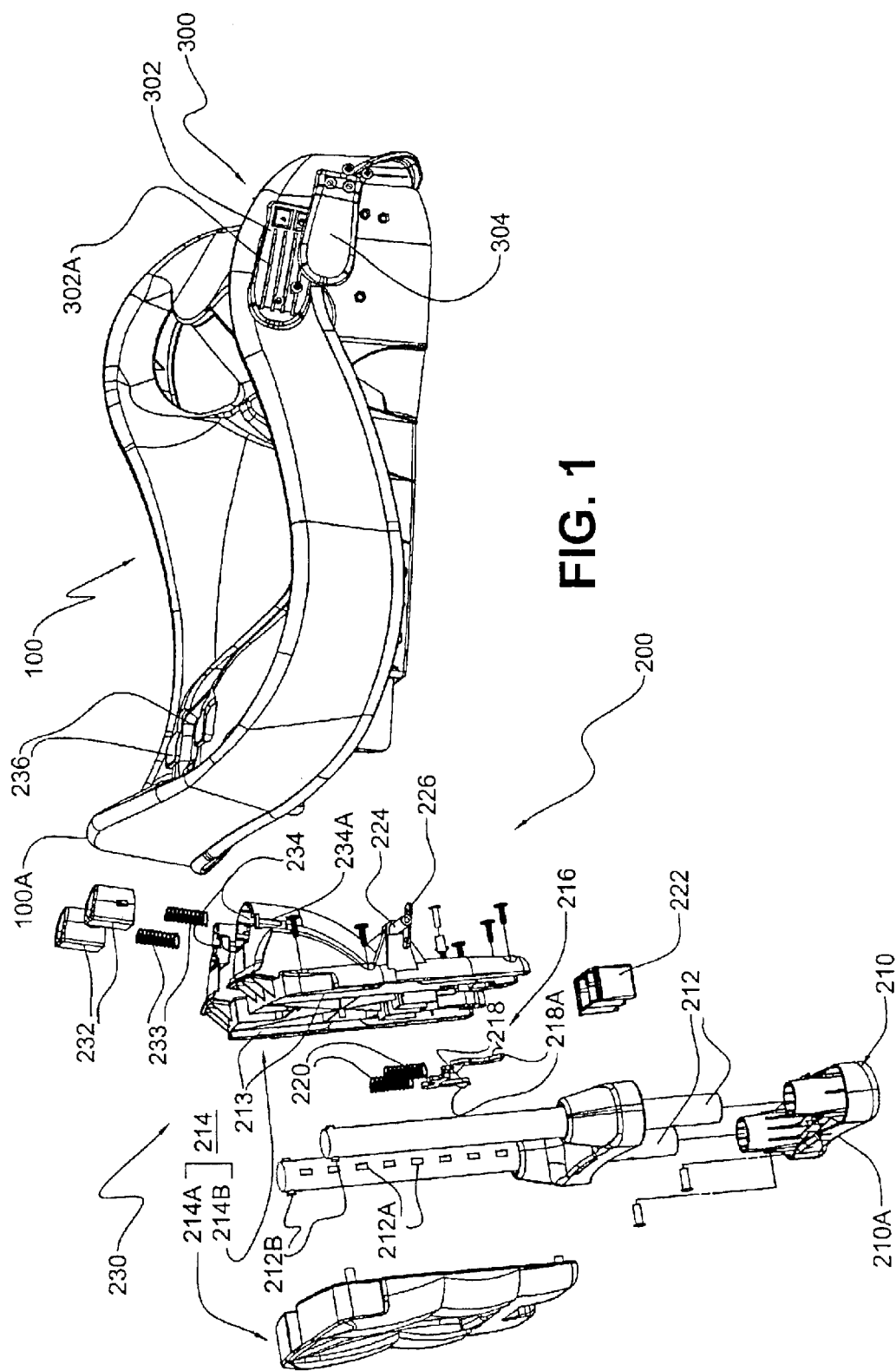
FIG. 1 is an exploded perspective view of a seat supporting base member and a load leg according to an embodiment of the present invention.

FIGS. 1–8 show an embodiment of a seat arrangement for use in a vehicle in accordance with the invention. The seat arrangement can be used in any vehicle equipped for carrying an infant, toddler or child seats, including automobiles, sport utility vehicles, vans, trucks, planes, buses, trains, boats, and the like. This seat arrangement generally comprises a seat supporting base member 100 to which a child's seat (not shown) can be selectively engaged and disengaged. The base member 100 includes a load leg 200. The load leg 200 is pivotally mounted to a forward end 100A of the base member 100 and includes a foot member 210. The foot member 210 can have a curved lower surface 210A adapted to rest on top of a transmission tunnel of an automotive vehicle (neither shown) so that the base member 100 can be stably secured to the middle of the vehicle's rear seat at a location which is optimally located to minimize injury to a child in a side impact/collision. Although the central portion of the lower surface 210A of the foot 210 curves, the lower surface 210A becomes generally planar at either side so that, when the base member 100 is placed on the left- or right-side of the vehicle's rear seat, the foot 210 can balance on the flat surface of the rear floor pan of the vehicle and can spread out the force translated from the child's seat to the base member 100 in the event of a front collision. The foot 210 can be molded from polypropylene, polycarbonate or the like.

A pair of struts 212, which can be hollow tubes, for example, extend up from the foot 210 and are slidably received within channels 213 molded into a load leg housing 214. The housing 214, as show in FIG. 1, consists of front and rear halves 214A, 214B that are secured together with a plurality of un-numbered fastener elements and guides. The tubular struts 212 slide in and out of the housing 214 within predetermined limits. A latch mechanism, generally denoted by the numeral 216, is mounted in the housing 214 in the manner best seen in FIG. 8.

Figure 8:
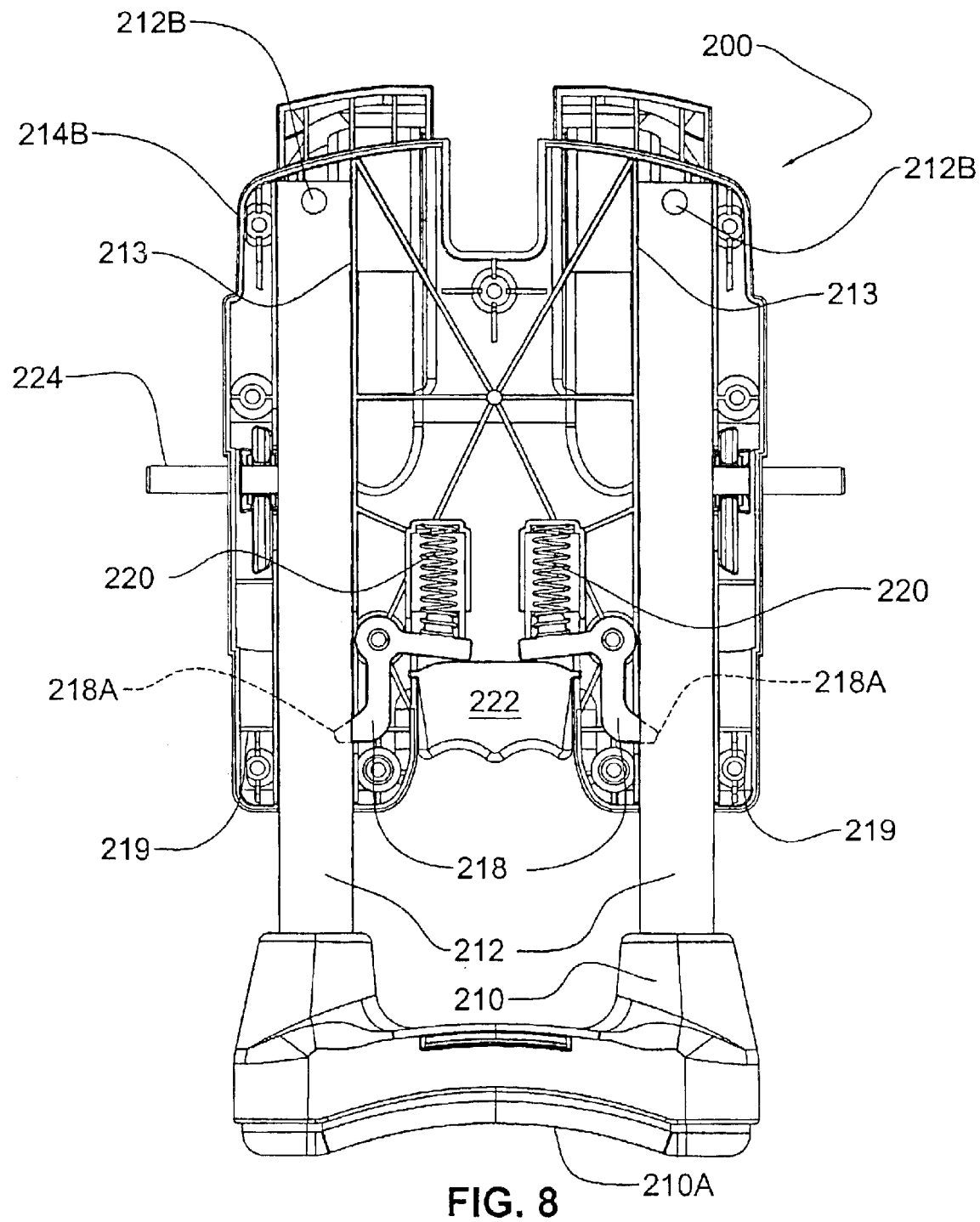
FIG. 8 is a front view of the load leg with a front half of the load leg housing removed to show features of the latch mechanism that enables telescopic adjustment of the load leg length.

The latch mechanism 216, as shown in FIG. 8, includes a pair of pawl-like pivotal latch members 218 with teeth 218A that engagingly extend into one of series of openings 212A formed along the inboard edges of the tubular struts 212. The latch members 218 are spring loaded by compression springs 220 so as to be constantly biased to pivot in a direction wherein the teeth 218A engage opposed openings 212A. A single, manually operable, button-like adjustment handle or member 222 is arranged to engage the latch members 218. Displacement of the adjustment handle 222 against the bias of the springs 220 (in FIG. 8, upward) induces the pivoting movement of the latch members 218 in a direction which retracts the teeth from the openings 212A.

Once the teeth 218A are retracted from the openings 212A, the tubular struts 212 can be slidably adjusted up (or down) relative to the housing 214. Release of the adjustment handle 222 permits the latch members 218 to pivot back in an engaging direction and to re-engage in the appropriate openings 212A. Although actuation of the adjustment handle 222 is necessary for upward movement of the struts 212 (to shorten the load leg), the struts 212 can be moved downward (to lengthen the load leg) without actuating the handle 222 by pulling on foot 210 in a direction away from the base member 100 with enough force to cause the teeth 218A to release from the openings 212A. The teeth 218A then slide along the inboard sides of the struts 212 until they reach the next set of opposed openings 212A, at which time they pivot into engagement in those openings 212A. The struts 212 can be ratcheted down in this manner until the load leg has been sufficiently lengthened. As shown in FIGS. 1 and 8, the struts 212 include retention bushings 212B that prevent the struts 212 from being pulled out of the lower end of the channels 213 in the load leg housing 214. The struts 212 can be pulled downward, away from the base member 100, only until bushings 212B contact ribs 219 formed in the channels 213.

Figure 2:
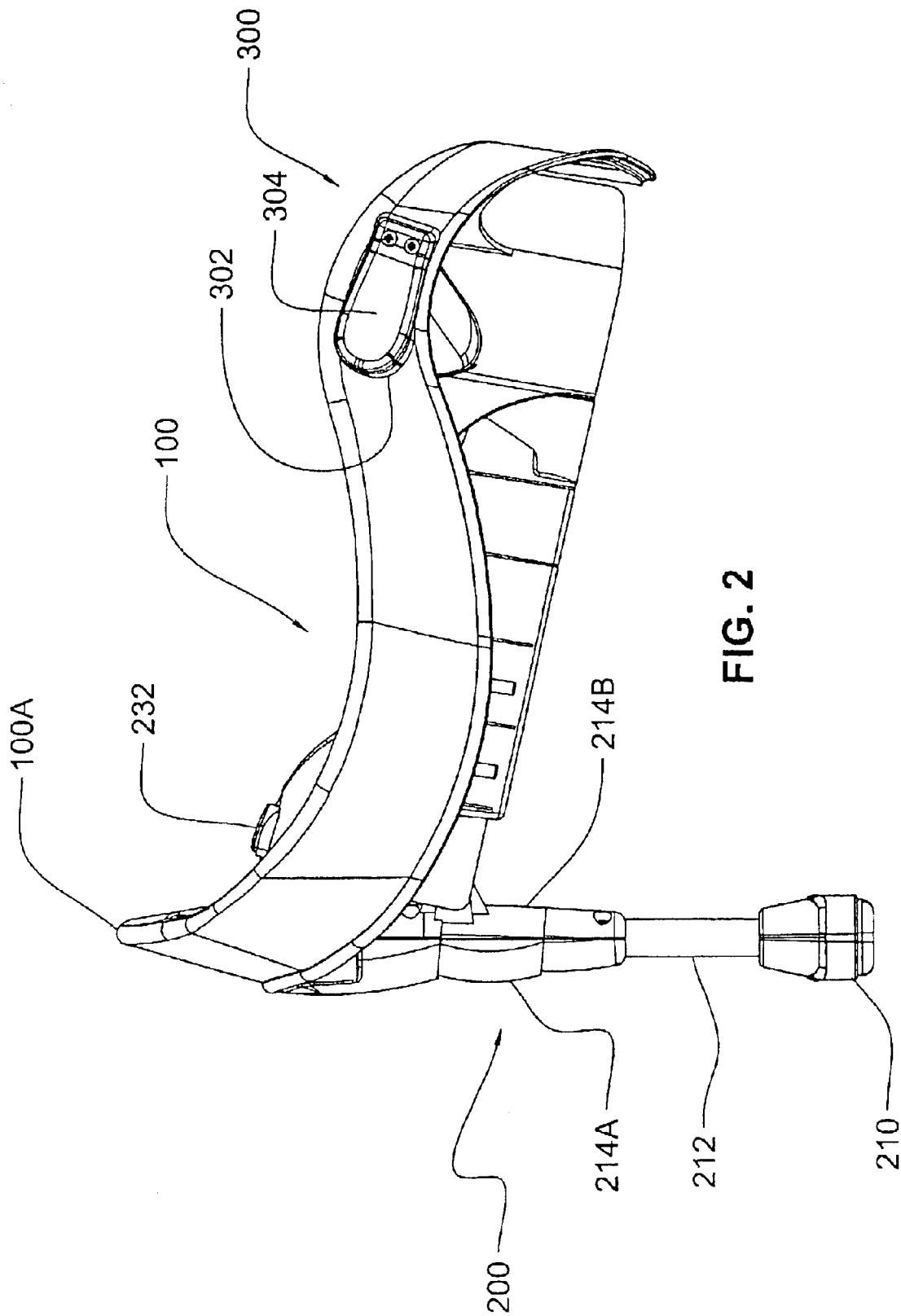
FIG. 2 is a side elevation view showing the load leg locked in an operative supporting position with respect to the base member.
Figure 3:
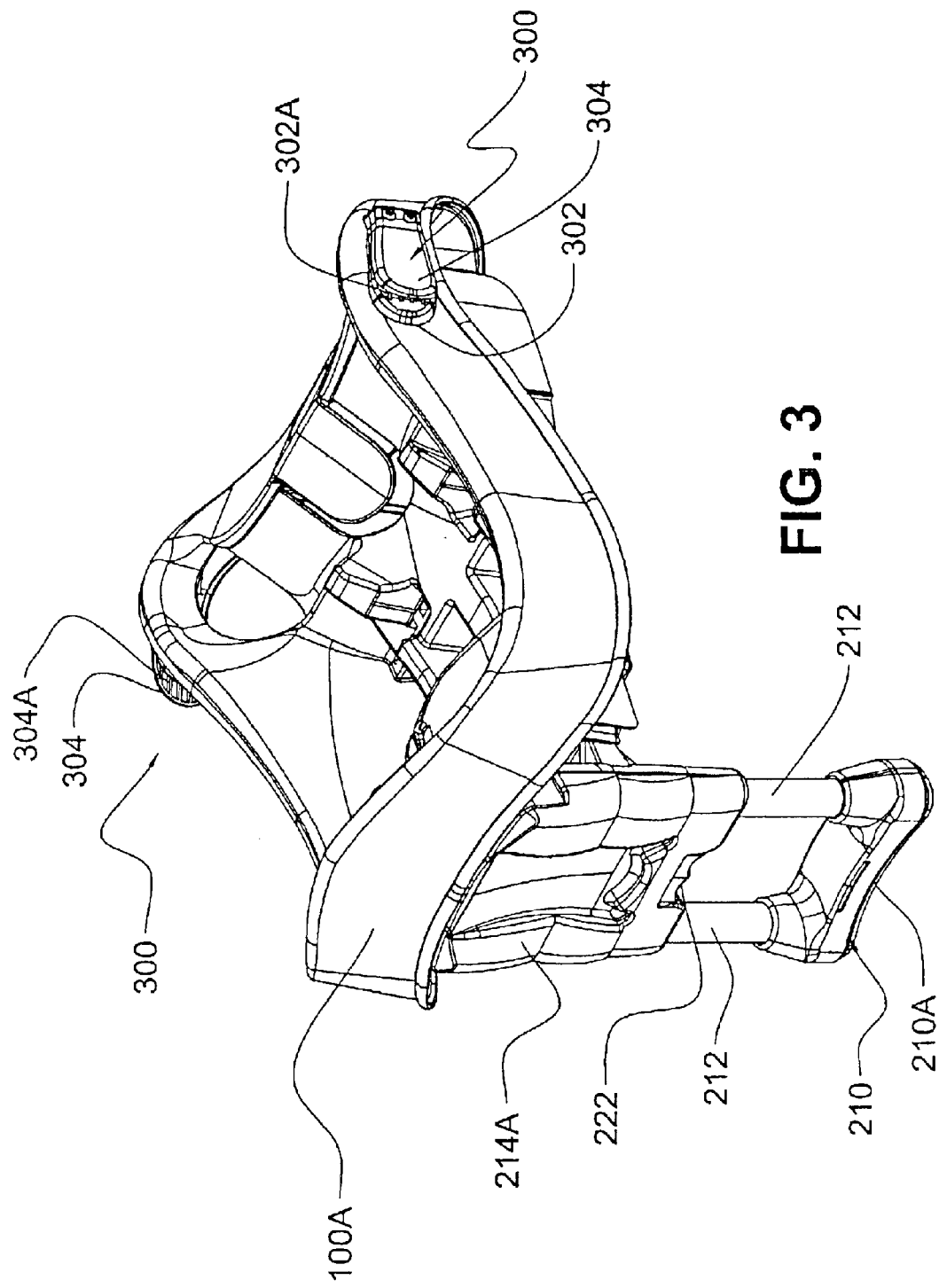
FIG. 3 is a perspective view similar to that shown in FIG. 2, depicting topographical features of the base member.
Figure 4:
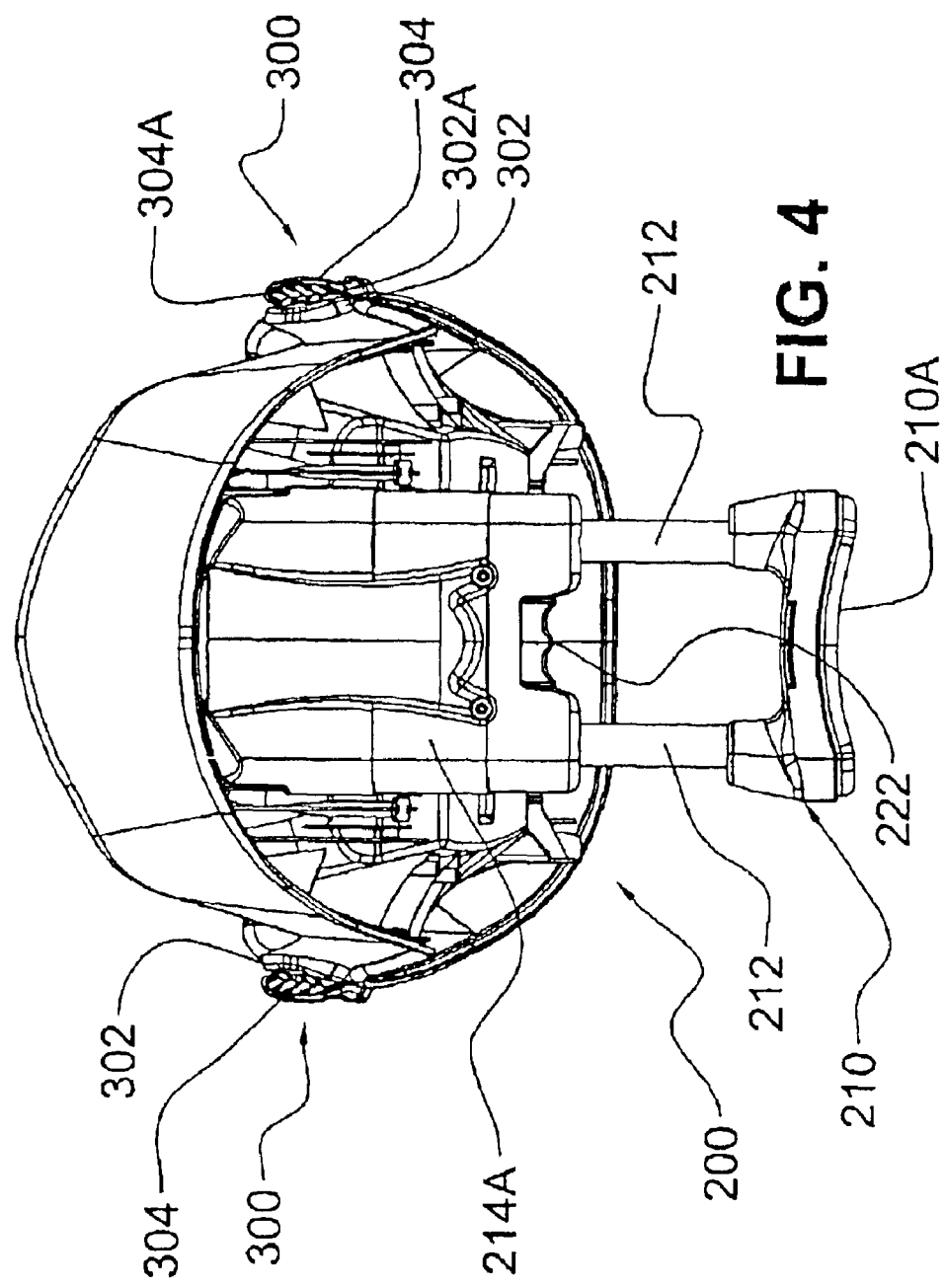
FIG. 4 is a front elevation view showing the load leg locked in its operative supporting position with respect to the base member.
Figure 5:
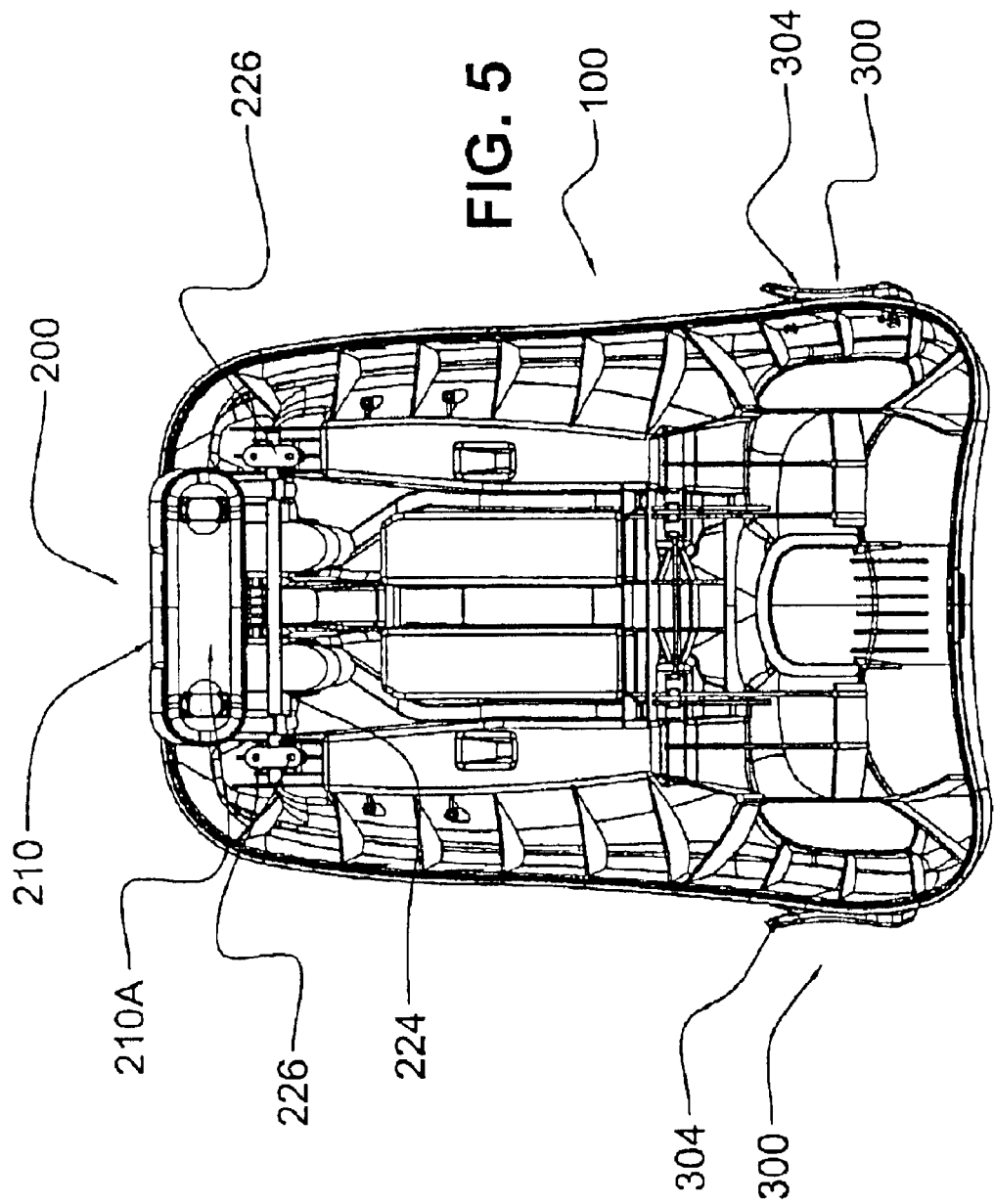
FIG. 5 is a bottom view of the base member with the load leg locked in its operative supporting position.
Figure 6:
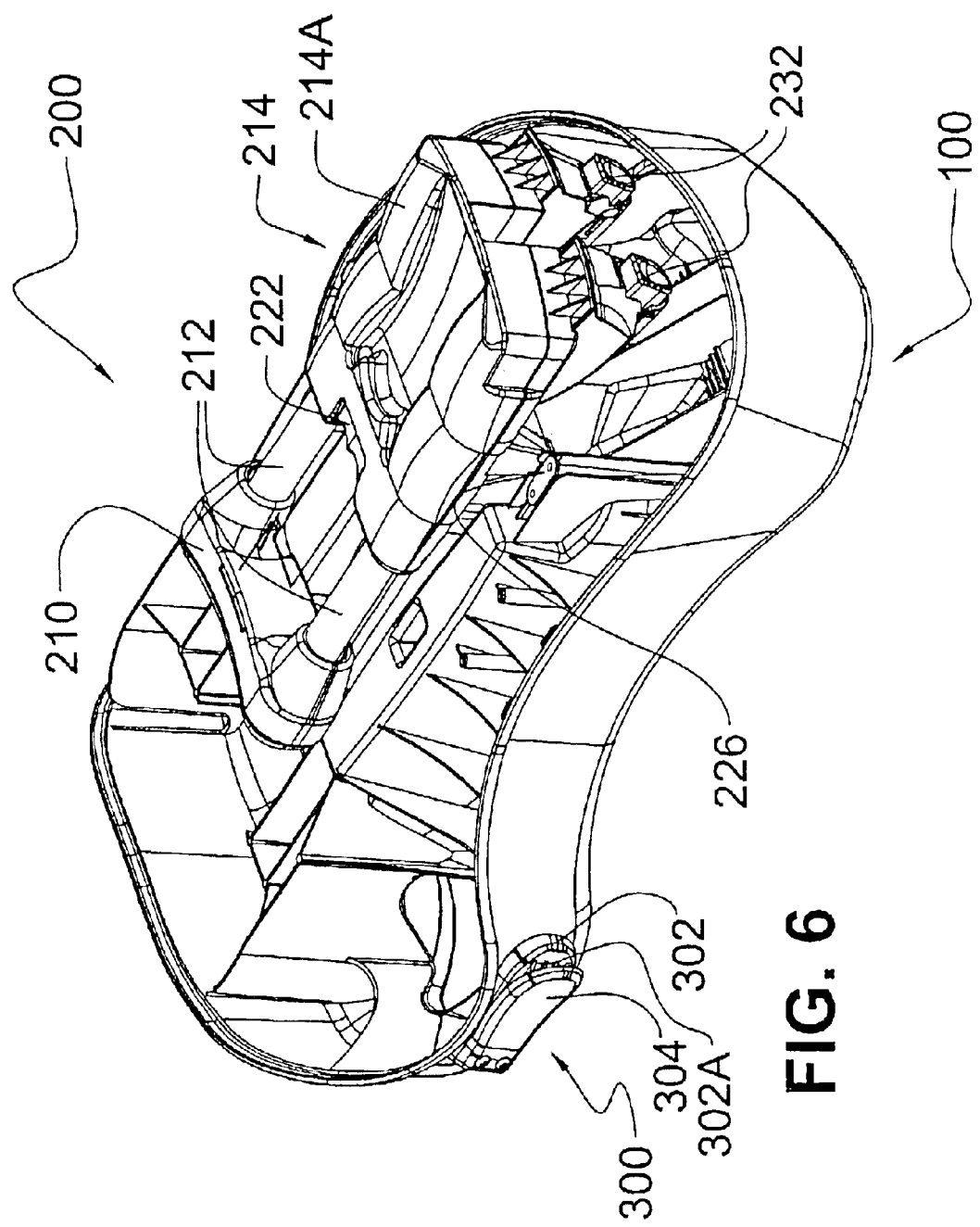
FIG. 6 is an inverted perspective view showing the lower surface of the base member and the manner in which the load leg arrangement folds against the lower surface of the base member.
Figure 7:
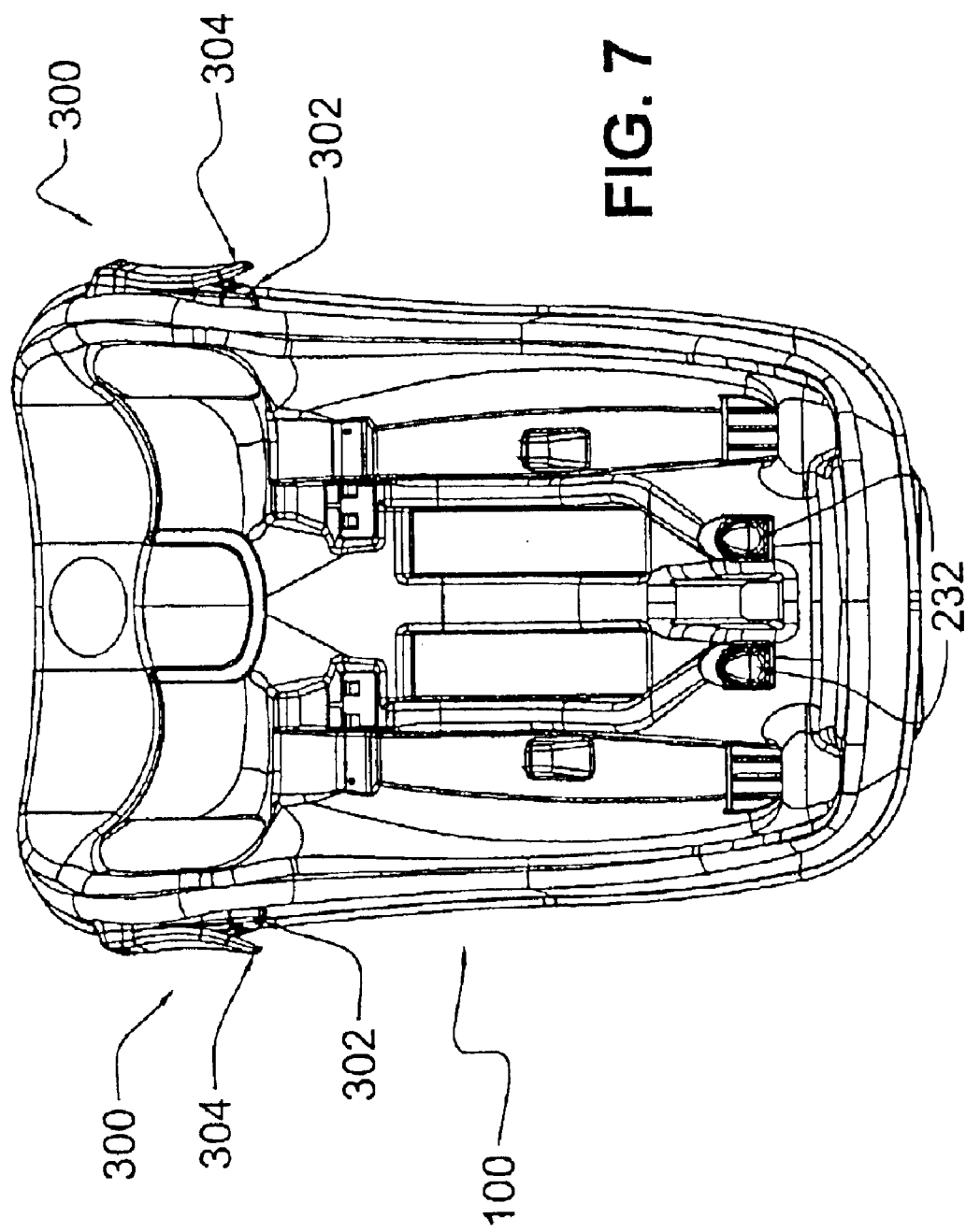
FIG. 7 is an top view of the base member.

The housing 214 of the load leg 200 is pivotally supported on a pivot shaft or tube 224 which is rigidly connected at both ends to the underside of the base member 100 by way of connection brackets 226. A fold latch arrangement 230, indicated generally in FIG. 1, is provided as part of the housing 214 of the load leg 200. In this embodiment, the arrangement 230 takes the form of a pair of spring loaded block-like lock members 232 that are respectively arranged to project through a pair of openings 236 formed in the base member 100 when the load leg 200 is pivoted to its operative position, as seen in FIG. 2. Engagement between the sides of the lock members 232 and the edges of the openings 236 restrains the load leg 200 against pivotal movement. The load leg 200 is maintained in this operative position until such time as the lock members 232 are manually depressed to a level where engagement with the edges of the openings 236 is lost, and resistance to pivotal movement is removed. Under these conditions, the load leg 200 can be folded back to its stored position illustrated in FIG. 6.

More specifically, as shown in FIG. 1, the above-mentioned lock members 232 of this embodiment each comprise a hollow molded member which is configured to receive one end of a compression spring 233. The lock members 232 also are slidably disposed in recesses 234 which are molded into the rear half 214B of the load leg housing 214. The lock members 232 each are formed with small retention barbs 232A on each side. The lock members 232 are pressed into the recesses 234, and barbs 232A are received in slots 234A. Engagement between the upper end of the slots 234A and the barbs 232A limits the maximum degree of projection of each of the lock members 232 and retains them in the recesses 234.

In one embodiment, the lock members 232 are made of nylon, while the front and rear halves 214A, 214B of the load leg housing 214 are molded from polypropylene, polycarbonate or the like. It is preferable to form the sliding lock members 232 of a different material from that of the housing 214 so that the lock members 232 can slide easily along the recess walls. Nylon (or similar material) provides suitable self-lubricating properties and ensures reliable operation of the lock members 232. The single, manually operable, button-like adjustment handle or member 222 which is associated with the latch members 218 is, in this embodiment, also made of nylon for the same reason.

The rear or aft end of the base member 100 (viz., an end of the base member distal from that at which the load leg 200 is pivotally mounted) is provided with a pair of lock-off members 300. The lock off members 300 are located on either side of the base member 100 and are adapted to receive and grip seat belt webbing (not shown) of a vehicle shoulder belt. Once the seat belt is pulled into a lock off member 300, it is gripped in a manner which strongly inhibits sliding of the belt along its length or axial direction. A lock off member 300 is provided on either side of the base member 100 so that the base member 100 can be used on either side of, or in the middle of, a vehicle. In addition, the lock off members 300 are operative with either a 2-point or 3-point adult seat belt.

The lock off devices 300 each include inner and outer members 302, 304. As best seen in FIG. 1, the inner member 302 is fixed to the base member 100, such as by bolts or nylock nuts, so as to be restrained against any movement relative to the base member 100. The outer member 304, on the other hand, is secured only at one end to the inner member 302 via bolts and nylock nuts, for example. This cantilevered attachment endows the outer member 304 with the ability to flex relative to the inner member 302 by a small amount and to act as a type of non-adjustable alligator clamp. A tapered clearance is defined between the "jaws" of this arrangement into which a seat belt can be pulled and easily wedged. The inboard surfaces of the inner and outer members 302, 304 additionally are provided with ribs or splines 302A, 304A which interleave and overlap by amounts selected so that, when seat belt webbing is slid between the inner and outer members, it is gripped and forced into a gently serpentine configuration to produce sufficient friction that movement of the seat belt webbing along its axial length direction is prohibited. The interleaving of the ribs 302A, 304A can be seen in FIG. 4.

While the present invention has been described with reference to one embodiment/arrangement, it will be understood that the present invention is not limited thereto and, as will be readily appreciated by the person of skill in the art to which the present invention pertains, given the preceding disclosure, can be modified without departing from the scope and spirit of the invention.

In one alternative embodiment, for example, while the two tubular struts have been described as being latched and unlatched via the use of a single manually manipulable member, i.e. element 222, the invention is not limited to this arrangement. Although member 222 simplifies the adjustment operation, the present invention can have an individually operable latch operating member associated with each of the tubular legs, if so desired.

In addition, in another alternative embodiment, the latch members 218, while being described as being associated with separate compression spring members, could be replaced with latch members that have integrally arranged springs, such as leaf spring arrangements which are integrally or unitarily formed with the latch members. The latch members 218 are preferably formed of metal for the purposes of strength and safety. Alternatively, they can include a plastic covering which encompasses the integral leaf spring arrangement.

In a further alternative embodiment, the fold latches 230 can be replaced with a single resiliently biased member. Or, they can be replaced with a different arrangement, wherein the pivot shaft or shafts about which the load leg pivots can be supported by a pair of opposed L-shaped slots formed in the load leg housing, and wherein the upper end of the load leg housing is arranged to be inserted into a socket or recess in the lower surface of the base member of sufficient depth and size so as to lock the load leg in its operative support position. Folding of the leg in this different embodiment can be achieved by pulling the load leg vertically downward so that pivot shaft(s) slides down the vertical leg of the L-shaped slots. The L-shaped slots are selected to have a length which allows the load leg housing to clear the socket or recess. At this stage the load leg would be released and rendered pivotal. The load leg could then be maneuvered so that the pivot shaft is moved along the horizontal leg of the L-shaped groove, and the load leg assumes a folded stored configuration with respect to the base member.

Further, while FIGS. 1–8 illustrate a seat supporting base member 100 having a particular shape, the load leg of the present invention can be used with base members of different configurations. For example, the load leg can be employed on a base member with a differently-contoured upper surface to which a child's seat can be attached or with different height, width, and length dimensions. Also, the reinforcing ribs on the lower side of the base member, seen most clearly in FIG. 5, can be arranged differently in other embodiments of the base member.

The lock off devices, while being disclosed as similar to alligator jaw-like clamps, can be replaced with devices wherein the outer member is pivotally mounted and adapted to snap snugly down on the inner member or the like, without departing from the broadest aspects of the invention.

What is claimed is:

1. A seat arrangement comprising:
   a seat base to which a seat can be selectively engaged and disengaged;
   a load leg extending from one end of the seat base for engaging a vehicle floor, the load leg being pivotally mounted to the seat base and being adjustable in length;
   a latch mechanism associated with the load leg to permit the load leg to be locked at a selected length; and
   a lock off device for a seat belt, the lock off device including:
      an inner member fixed to a surface of the seat base; and
      an outer member having one end immovably integral with one end of the inner member and superimposed over the inner member so that a tapering clearance, into which a seat belt webbing can be easily slid, is established between a free end of the outer member and a corresponding end of the inner member
   wherein the load leg has a housing, and the latch mechanism has at least one pivotal latch member which selectively engages in openings formed in a strut reciprocatively mounted in the housing.

2. A seat arrangement comprising:
   a seat base to which a seat can be selectively engaged and disengaged;
   a load leg extending from one end of the seat base for engaging a vehicle floor, the load leg being pivotally mounted to the seat base;
   a fold latch arrangement which holds the load leg in an operative position until manually released; and
   a lock off device for a seat belt, the lock off device including:
      an inner member fixed to a surface of the seat base; and
      an outer member having one end immovably integral with one end of the inner member and superimposed over the inner member so that a tapering clearance, into which a seat belt webbing can be easily slid, is established between a free end of the outer member and a corresponding end of the inner member.

3. A seat arrangement as set forth in claim 2, wherein the fold latch arrangement comprises a lock member which protrudes through an opening formed in the seat base and which locks the load leg against pivotal movement until manually depressed to a level whereat engagement between the lock member and the seat base is absent.

4. A seat arrangement as set forth in claim 2, further comprising a selectively releasable latch mechanism associated with the load leg to permit the load leg to be locked at a selected length.

5. A seat arrangement as set forth in claim 2, wherein the lock-off device is adapted to clamp the seat belt webbing against movement in its axial direction.

6. A seat arrangement as set forth in claim 2, wherein the load leg is provided with a foot having a curved surface adapted to rest on a curved surface of a transmission tunnel hump of a vehicle.

7. A seat arrangement as set forth in claim 2, wherein the load leg has a housing and at least one telescopically mounted strut which is slidably received in the housing.

8. A seat arrangement as set forth in claim 7, wherein the at least one telescopically mounted strut comprises a pair of struts which are slidably received in the housing.

9. A seat arrangement comprising:
a seat base to which a seat can be selectively engaged and disengaged;
a load leg extending from one end of the seat base for engaging a vehicle floor, the load leg being pivotally mounted to the seat base;
a fold latch arrangement which holds the load leg in an operative position until manually released; and
a lock off device for a seat belt, the lock off device including:
an inner member fixed to a surface of the seat base; and
an outer member having one end immovably integral with one end of the inner member and superimposed over the inner member so that a seat belt receiving clearance is established between a free end of the outer member and a corresponding end of the inner member.

* * * * *